Aug. 20, 1968    S. M. DE CORSO    3,398,229
NONCONSUMABLE ARC ELECTRODE
Filed Oct. 29, 1964    4 Sheets-Sheet 2

INVENTORS
Serafino Mario De Corso
& Charles B. Wolf
BY *Maury I. Hull*
ATTORNEY

United States Patent Office 3,398,229
Patented Aug. 20, 1968

3,398,229
NONCONSUMABLE ARC ELECTRODE
Serafino Mario De Corso, Wilkins Township, Allegheny County, and Charles B. Wolf, North Huntingdon Township, Westmoreland County, Pa., assignors to Westinghouse Electric Corporation, East Pittsburgh, Pa., a corporation of Pennsylvania
Filed Oct. 29, 1964, Ser. No. 407,327
31 Claims. (Cl. 13—18)

ABSTRACT OF THE DISCLOSURE

An electrode for use in an arc furnace has a column assembly formed of a plurality of coaxially mounted tubes of graduated diameters forming fluid flow passageways and an electrode tip including a hollow generally annular outer portion secured to one or more of the tubes, the tip including an inner portion spaced from the outer portion to provide a fluid flow passageway for sheet flow of cooling fluid near the arcing surface, the inner portion being mounted on a cylindrical support and fluid channeling member disposed at the lower end of the electrode between coaxial tubes, the inner portion of the tip having an annular passageway therein, preferably square or rectangular in cross section, in which is disposed a magnetic field coil within a coil housing composed of insulating material. In one embodiment the coil is composed of hollow conduit and is fluid cooled. Hub means, either fluid cooled or composed of refractory material, closes the central aperture of the structure at the arcing end thereof.

---

This invention relates to improvements in electrodes especially suitable for use in arc furnaces, and more particularly to an improved nonconsumable electrode.

In the electric arc furnace art, it has been the practice heretofore to use carbon and graphite electrodes in all arc furnaces including electric arc furnaces of the submerged arc type, the direct arc type and the indirect arc type. In the direct arc furnace the majority of the power input to the furnace is concentrated in an arc spanning between the electrode and the material to be heated, usually called the melt. In the indirect arc furnace the arc spans between two electrodes; in this case the material to be heated does not form one of the electrodes as is the case for the direct arc furnace. In the submerged arc furnace, the electrode is submerged in the material to be heated, and the heat input to the bath takes place through resistance heating, as well as through a large number of small arcs spanning between the electrode and the material to be heated, and between particles of the material itself.

In all of the above cases the carbon or graphite electrode material is used up through oxidation, or sublimation, or chemical action with the material to be heated, or through breakage. Carbon and graphite electrodes must be constantly replaced as the electrodes are used up. Furnace down-time necessary for adding to the electrodes, slipping the electrodes in their copper holders, or for removing broken pieces of electrode from the furnace can represent a considerable loss of production estimated as 2% to 3% of the operating time.

In a copending application of A. M. Bruning for "Electric Arc Furnaces and Nonconsumable Electrode for Use Therein," Ser. No. 407,332, filed Oct. 29, 1964, and assigned to the assignee of the instant invention, there is described and claimed a nonconsumable electrode which eliminates much of the expense, shut-down time, and operating difficulties of carbon and graphite electrodes which are consumed during furnace operation. The nonconsumable electrode described in the copending application includes an annular water cooled electrode face member forming an arcing surface, a supporting structure composed at least partially of electrically conductive material and electrically connected to the electrode face member, the supporting structure including means forming passageways for bringing a cooling fluid to the electrode face member and conducting fluid from the electrode face member, the conductive portion of the supporting structure being connected to a source of potential to produce an arc from the electrode face member, and a field coil disposed near the electrode face member, the field coil being energized and setting up a magnetic field at the arcing surface of the electrode face member which causes the arc to move continuously around the annular arcing surface of the electrode face member. An elongated member composed of a highly heat resistant material such as a ceramic forms part of the supporting structure and encloses and protects the remainder of the supporting structure from heat of radiation and convection from the arc and gases, and closure means or plug means composed of a highly heat resistant material such as a ceramic closes the central aperture through the annular electrode face member.

Our invention is an improvement upon and advance over the nonconsumable electrode of the copending Bruning application, and includes many new and novel features. Our supporting structure is tubular and includes coaxially disposed sleeves of different diameters to form passageways for the flow of a fluid, including an annular or cylindrical-shaped passageway. An outer sleeve preferably composed of steel provides maximum structural strength, and a ceramic sleeve external to the steel sleeve provides a heat shield. We provide a unique and novel fluid channeling member which also supports the electrode face member in a manner to provide passageways near the arcing surface of the electrode face member for the flow of the cooling fluid. Our field coil is supported in a position where the magnetic lines of force follow the contour of the arcing surface. The coil supporting member is preferably made of a magnetic material, which reduces the reluctance of the flux path. In some embodiments a water cooled plug fills the central aperture of the annular electrode face member. In another embodiment, a portion of the surface of the electrode face member is coated to provide a thermal shield.

Accordingly, a primary object of the invention is to provide an improved nonconsumable electrode for use in an arc furnace.

Another object is to provide a new and improved electrode which is not consumed during use in an arc furnace and having new and improved heat shield means.

A further object is to provide a new and improved electrode in which the arc is moved over the electrode surface by a magnetic field produced at the arcing surface of the electrode having lines of force which conform to the contour of the arcing surface.

Still a further object is to provide a new and improved nonconsumable electrode in which the arcing surface of the electrode is water cooled in an improved manner.

These and other objects will become more clearly apparent after a study of the following specification, when read in connection with the accompanying drawings, in which:

FIGURES 1A and 1B taken together are a cross-section through an electrode according to our invention;

Figure 1A:
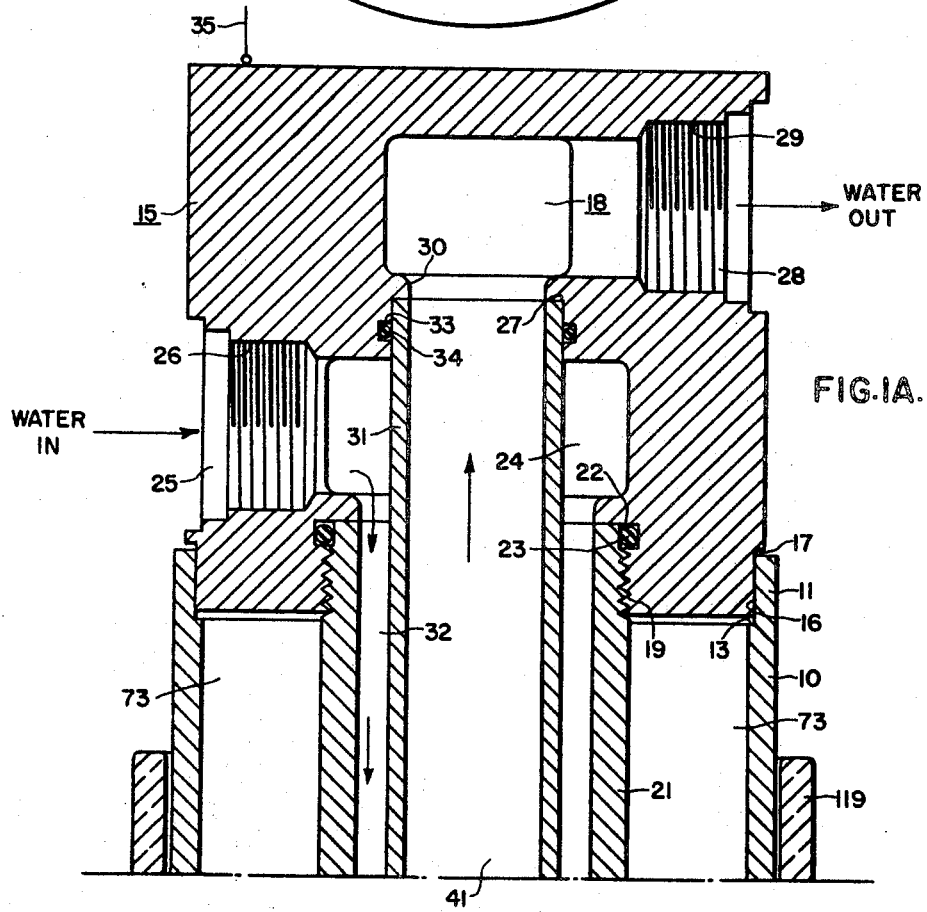

Referring now to the drawings in which like reference characters are used throughout to designate like parts, for a more detailed understanding of the invention, and in particular to FIG. 1 thereof, there is shown at 10 a long tube preferably composed of steel or other metal having portions 11 and 12 of increased inner diameter at each end thereof to form shoulders 13 and 14. These shoulders, as will be seen hereinafter, provide means for positioning the tube with respect to other parts of the electrode structure. In the description hereinafter, the portion of the electrode where the arc takes place will be referred to as the electrode face member, or the electrode face portion, and this portion is seen at the bottom of the electrode. At the upper end there is a substantial block or head 15 composed of metal having a portion of the outer wall 16 arranged to fit snugly in the aforementioned tube 10. The lower surface of the block 15 may abut against the aforementioned shoulder 13, and the adjacent end of the tube 10 may also abut against the shoulder portion 17 formed in the head 15. The block 15, as seen, is not cylindrical, but is more nearly rectangular, so that portions of the space 73 between tube 10 and a coaxially extending inner sleeve 21 hereinafter to be described are open at the upper end of the electrode, and provide ventilation and space for the entrance of the coil leads. An axially extending or downwardly extending passageway 18 in head 15 is seen to have a portion 19 which is threaded on the internal surface thereof, and which is in threaded engagement with the adjacent threaded end of the metallic sleeve 21, preferably copper. As will be seen hereinafter, by the threaded connection at 19 the sleeve 21 secures the head 15 to the active electrode structure and provides positive current carrying means. There is an annular groove 22, FIG. 1A, in head 15 in which is disposed a sealing O-ring 23.

An annular chamber 24 is formed inside the member 15, communicating with an annular passageway 32 formed between sleeve 21 and a sleeve of smaller diameter 31 coaxial therewith, the chamber 24 having a water inlet 25 communicating therewith, the water inlet 25 having a threaded wall portion 26, if desired, as shown. It is further seen that the aforementioned axially extending passageway 18 has at 30 a portion of reduced inner diameter to form the shoulder 27. The passageway 18 communicates with a water outlet 28 having a threaded inner wall portion 29. The aforementioned metallic sleeve 31 has its upper end snugly fitting the inner wall of the passageway 18 and having the end thereof abutting against the aforementioned shoulder 27, this sleeve 31 having therein passageway 41, the sleeve 31 also forming together with the aforementioned sleeve 21, the aforementioned annular passageway 32 for the flow of water to the electrode face member. It is seen that disposed in an annular groove 33 around or near the upper end of the sleeve 31 is an O-ring seal 34. Passageway 41 conducts cooling fluid from the electrode face member to water outlet 28.

The other or lower end of the aforementioned metallic sleeve 21 is seen to be threaded at 36 on the external surface thereof and to be in threaded engagement with the internally threaded surface of a generally cylindrical coil and electrode face supporting member generally designated 37, which also serves as a fluid channeling member and magnetic path forming member where it is composed of magnetic material. The coil and electrode face supporting member 37 is seen to have a shallow annular groove 38 around the outside surface thereof, with large peripherally spaced bores communicating between the groove 38 and the interior of the cylindrical member 37, one of these bores being shown at 39, the bores opening into the aforementioned annular passageway 32 so that water flows from the annular passageway 32 through the transverse bores or passageways 39 into the space formed by the groove 38.

Disposed around the outside of support member 37 is a metallic sleeve 100. The aforementioned support member 37 is also seen to have an extended portion of slightly reduced outer diameter to provide an annular passageway 40 between the inner wall of sleeve 100 and the outer wall of support member 37 for the flow of water to the face of the electrode, as will be seen hereinafter. An annular groove 42 in the support member 37 has an O-ring 43 therein to provide close sealing engagement, and annular groove 59 has O-ring 60 therein. The cylindrical support member 37 is also seen to have formed on the inner surface thereof the shoulder 44 against which abuts the adjacent end of the sleeve 21. A portion of the inner surface of the support member 37 is seen to be threaded at 46 and to be in threaded engagement with the threaded outer surface of a fluid channeling member generally designated 48, and which has a retaining screw 49 in threaded engagement therein, which is provided for purposes to be made more clearly apparent hereinafter. The fluid channeling member 48 has an axially extending passageway 51, with a portion of increased inner diameter forming a shoulder 52 against which abuts the adjacent end of the aforementioned sleeve 31. Fluid channeling member 48 is seen to have a wide shallow annular groove 53 around the outside surface thereof and to have peripherally spaced transverse bores therethrough, one of these bores being shown at 54, and to have the outer wall portion 55 spaced from the inner wall of the support member 37 to form the annular passage 56. As will be described hereinafter in detatil, water entering the water inlet 25 flows down through the passageway 32, through the transverse passageway 39 into the annular groove 38 into the annular passageway 40 and thence around a cooling circuit adjacent the electrode face. It is seen that fluid channeling member 48 has an annular groove 57 on the inner surface thereof with an O-ring 58 for providing close sealing between the wall of the member 48 and the outer wall of the sleeve 31.

The aforementioned coil and electrode face supporting member generally designated 37 is seen to have small annular flanges on both the inner surface and the outer surface thereof to form shoulder 61 on the inner surface, and shoulder 62 on the outer surface. Mounted on the lower end of support member 37 is a generally annular sleeve member 64 having radially spaced concentric cylindrical wall portions 67 and 83, and having ring-shaped end portion 89 having an arcuate outer surface in cross section and a flat inner surface 70. The outer wall portion 83 at the upper end thereof abuts against the shoulder 62, and the inner wall portion 67 at the upper end thereof abuts against the shoulder 61. It is further seen that the support member 37 has annular groove 65 with O-ring 66 in the outer cylindrical surface thereof, and has annular groove 68 with O-ring 69 in the inner surface thereof. As previously stated, the end of the sleeve member 64 is seen to have a portion forming a substantially flat ring-like surface 70, and the annular space in sleeve 64 between the surface 70 and the flat inner surface 63 of support member 37 is occupied by a magnetic field producing coil 71 in a coil housing 72 composed of electrically insulating material, for example a ceramic.

Figure 6:
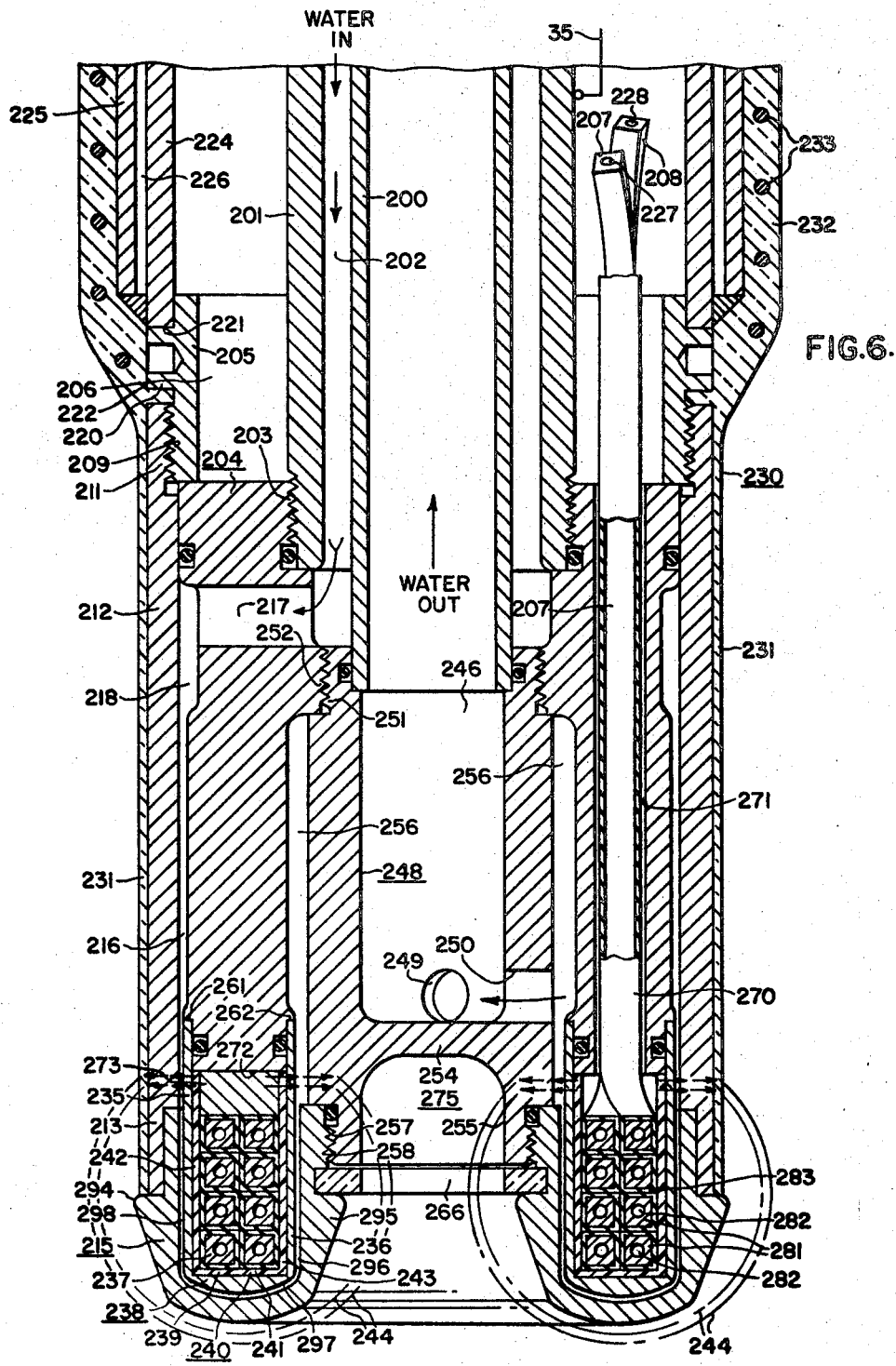
FIG. 6 is a view of a recessed hub electrode according to still a further embodiment of our invention.

The coil 71 is preferably composed of hollow copper tube wound in a direction which is parallel to the electrode face, with the turns insulated from each other. Cooling water passes through the coil tubing to remove the heat generated within the coil. Such a construction is shown in FIG. 6, to be described in detail hereinafter.

Figure 2:
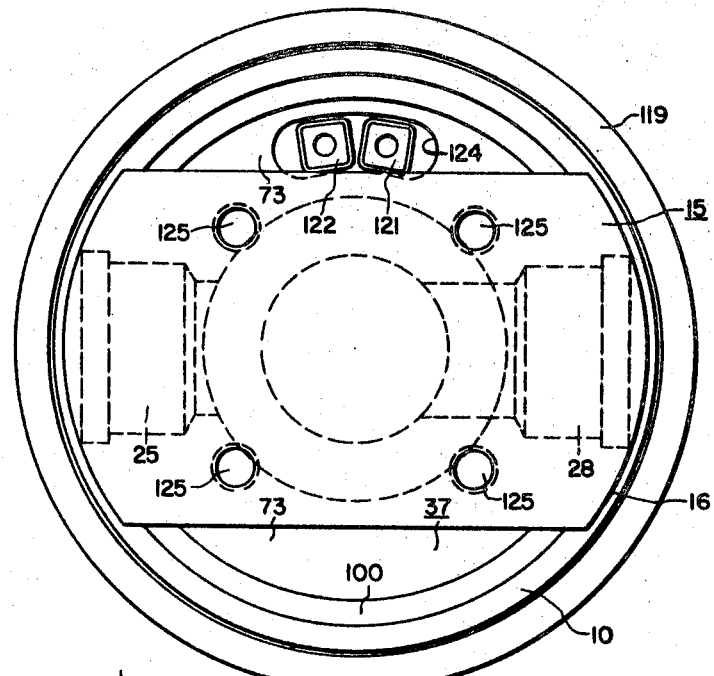
FIG. 2 is an end or plan view of the electrode of FIG. 1.

Two insulated leads 121 and 122, FIG. 2, for energizing the coil 71 extend up from housing 72 through an axial or longitudinal passageway 124 in the support member 37, and extend through the space or chamber 73 formed between tube 10 and the aforementioned sleeve 21. From thence the leads extend and pass to terminal means which may include cooling water connecting means adjacent the head 15, and insulated therefrom, electrical leads 121 and 122 to the field coil being shown as hollow.

Support member 37 and sleeve member 64 may be thought of as together constituting fluid channeling means.

The aforementioned fluid channeling member generally designated 48 is seen to have at the lower end thereof an axially extending annular ring or flange portion 75, and mounted in the space formed by the flange portion 75 is a retaining member 76 having an annular groove 77 therein in which is disposed O-ring 78. Retaining member 76 has an axial bore 79 therein through which passes the shank portion of the aforementioned bolt 49. The head 81 of the bolt 49 is seen to abut against a shoulder 80 formed in the retaining member 76, and to firmly secure member 76 in position with respect to member 48. Retaining member 76 may also be made of magnetic material to further reduce the reluctance of the flux path. Disposed around the head 81 of the bolt 49 is a coiled spring 82 with the upper end as seen in the figure abutting against the shoulder surface 80 of retaining member 76, and the lower end abutting against a plug 84 composed of a highly heat resistive material such as a ceramic. Plug 84 has an end portion 85 of reduced outer diameter to form a groove in which is disposed a portion of a retaining ring 86 composed of ceramic or other highly heat resistive material.

The aforementioned retaining member 76 is seen to have the lower end thereof of reduced outer diameter, threaded at 87, with an O-ring 88 for providing sealing engagement with a generally ring-shaped or cylindrical-shaped electrode face member generally designated 90, this electrode face member 90 having the inner cylindrical wall portion threaded on the outside surface thereof at 91, with the threads in engagement with the aforementioned threads 87 on retaining member 76, the electrode face member 90 also having threads 92 on the outer surface of the outer cylindrical wall portion for purposes to be made hereinafter more clearly apparent. The head portion 93, which forms the arcing surface, is shaped to provide annular skirt portions 94 and 95. It is seen that when the electrode face member generally designated 90 is screwed into the position shown, that there are annular or cylindrical-shaped passageways 96 and 98 formed between the walls of the sleeve 64 and the adjacent walls of the electrode face member generally designated 90. There is also a passageway 97, arcuate in cross section, adjacent the front or lower end of the face member 90, and directly behind the arcing surface area. These passageways 96, 97 and 98 complete a circuit for the flow of a cooling fluid from the water inlet 25 to the water outlet 28, this circuit being traced as follows: inlet 25, down passageway 32, through transverse bores 39 to groove 38, to annular passageway 40, to annular passageway 98, to arcuate passageway 97, to annular passageway 96, to annular passageway 56, to groove 53, to transverse bores 54, up passageway 41 to the water outlet 28.

As aforementioned, the tube 10 has a shoulder 14 formed on the inner surface thereof at the lower end 12 thereof. Abutting against the inner wall of the portion of increased inner diameter 12, and abutting against the shoulder 14, is the aforementioned long metallic sleeve member 100 having a portion of increased outer diameter 101 at the lower end thereof. Adjacent the outer wall of the metallic sleeve 100 is an annular ring 102 having a flange portion 103 and a threaded portion 104. The external threads on the threaded portion 104 engage the threads 107 on the internal surface of the end of an additional ring 106. Ring 106 also has the other end threaded at 108. Threads 108 engage aforementioned threads 92 in electrode face member 90. Ring 106 has annular grooves 109 and 110 therein containing O-rings 111 and 112 respectively for providing close sealing engagement with the portion of increased diameter 101 of the sleeve 100, and also with the outer wall portion of the electrode face member 90. Rings 102 and 106 may also be of magnetic material to further reduce the reluctance of the flux path.

Disposed around the outside of the tube 10 is a sleeve 119 composed of highly heat resistive material, such as ceramic, with the lower end abutting against a ring 118 composed of a highly heat resistive ceramic material. Ring 118 abuts against flange portion 103. There is further disposed around the end of the electrode face assembly a ceramic ring 117 having a shoulder 116 abutting against one end surface of the aforementioned ring 106. The ceramic members 119, 118, and 117, the ceramic ring 86 and the ceramic plug 84 provide thermal insulation for those portions of the electrode most directly exposed to the radiation from the arc itself, and to radiation from incandescent gases, and heat transmitted by convection.

It is seen that the entire annular electrode surface of the head portion 93 is water cooled. The field coil 71 is energized in a manner, as by direct current, to cause the arc to move continually in a circular path around the annular or circular surface of the electrode face member 90. The lines of force of the magnetic field 115 are seen to have a curvature which substantially follows the contour of the arcing surface as a result of the center of the field coil being located substantially at the virtual center of the arcuate arcing surface. For the purposes of showing the magnetic field, the supporting member 37 has been arbitrarily assumed to be composed of nonmagnetic material. A field of sufficient strength is provided to move the arc at a sufficient speed, in accordance with the teachings of the aforementioned copending application of A. M. Bruning.

The symbolical lead wire 35 is provided for bringing current to the electrode.

Particular reference is made again to FIG. 2, an end or plan view of the electrode, in which the aforementioned terminals for the leads to the field coil 71 are shown at 121 and 122. If desired, a terminal plate, not shown, may be secured to the head member 15 as by screws in bores 125.

The "electrode face means" may be thought of as including both the electrode face member 90 and the sleeve 64 spaced therefrom to form fluid passageways 96, 97 and 98.

There has been provided, then, apparatus well suited to accomplish the aforedescribed objects of the invention. The arc is moved continuously in a circular path over the surface of the electrode at rate sufficient to prevent substantial evaporation of the electrode material from the spot or spots on the electrode where the arc impinges; in accordance with the teachings of the aforementioned copending application of A. M. Bruning, water cooling of the electrode is at a rate adequate to insure a sufficiently low electrode surface temperature so that when the arc again impinges on the same spot, the temperature at that spot will not be caused to rise above the melting temperature of the electrode material for a long enough period of time to cause substantial loss of material.

It will be understood that electrode face member 90 and sleeve or coil cup 64 are composed of nonmagnetic material. Support member 37 is preferably composed of magnetic material, and fluid channeling member 48 may be composed of magnetic material. Members 37 and 48 may be composed of nonmagnetic material.

Figure 1B:
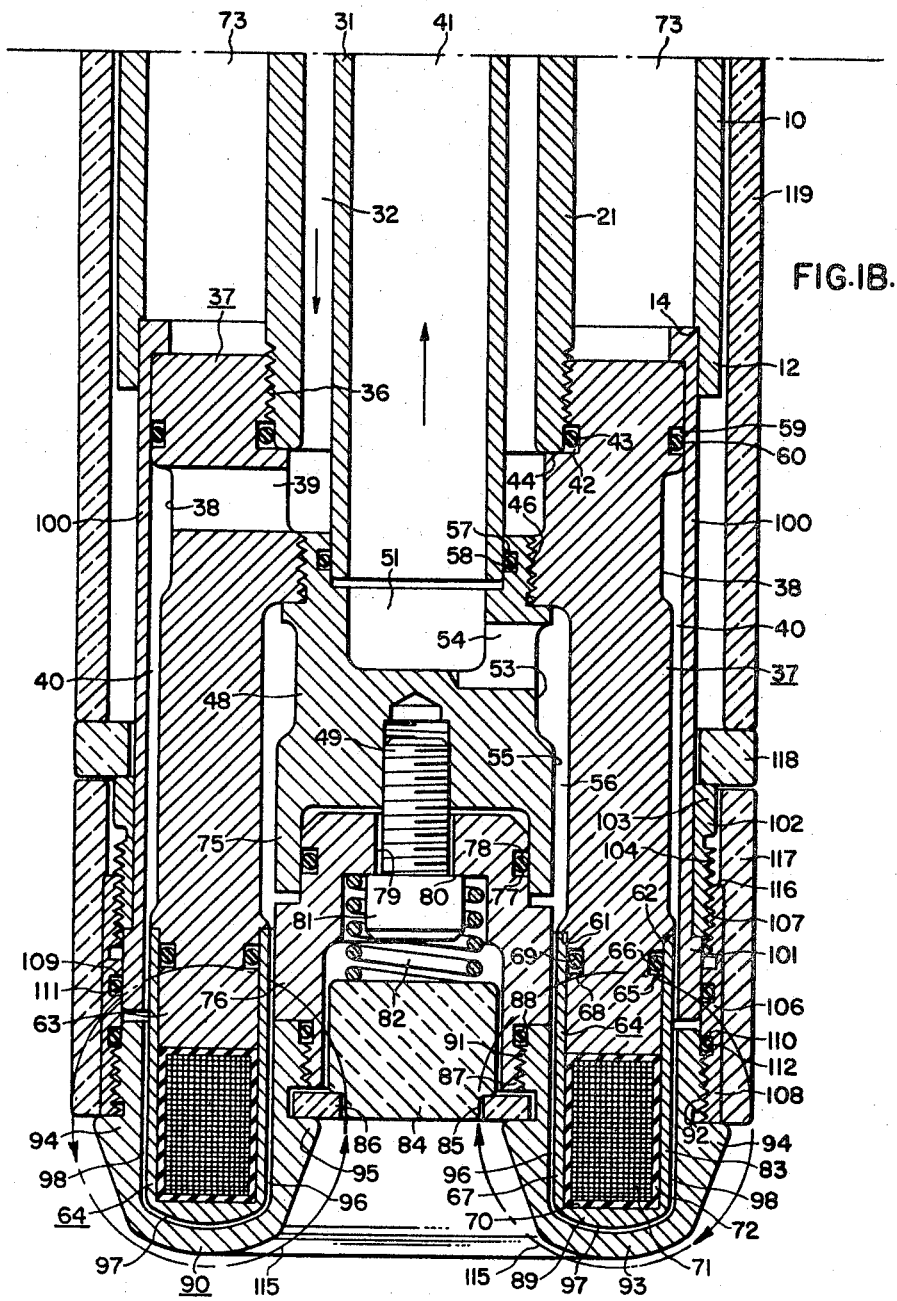
Figure 3:
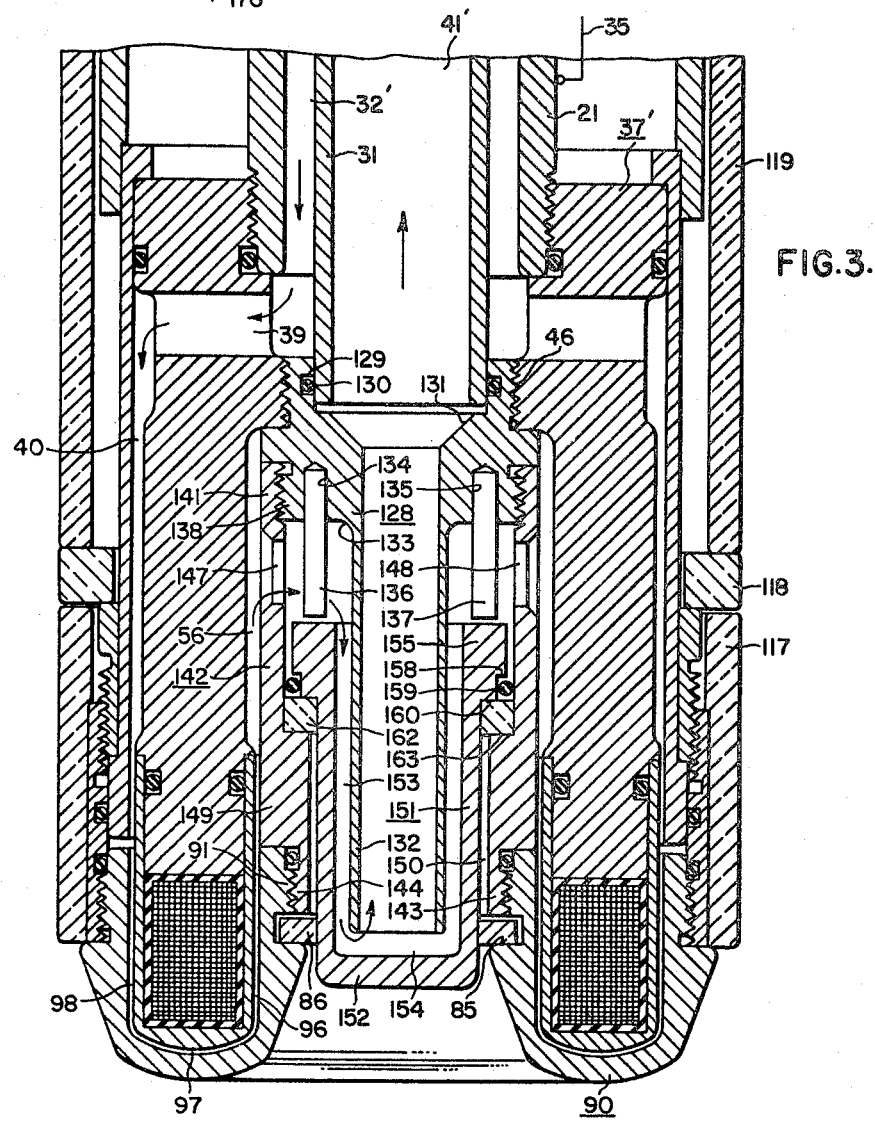
FIG. 3 is a cross-section through an electrode according to an additional and preferred embodiment of our invention having a fluid cooled hub.

Particular reference is made now to FIG. 3 where an additional embodiment of our invention is shown, in which the ceramic plug 84 of FIG. 1B has been replaced by a water cooled hub generally designated 140 enclosing the space formed by the central aperture of the annular electrode face member, the water cooled hub being electrically insulated from the arcing surface to prevent the arc striking to the hub. In FIG. 3, the annular fluid channeling and electrode face supporting member 37' is generally similar in shape to the corresponding member 37 of FIG. 1B. In the apparatus of FIG. 3, preferably water or other cooling fluid flows in the passageway 32' and out the passageway 41'. Disposed within the fluid channeling and supporting member 37' in threaded engagement therein at 46' is an elongated annular sleeve and supporting or retaining member generally designated 128 having an annular groove 129 therein in which is disposed O-ring 130 for providing close sealing engagement between the circular inner surface of retaining member 128 and the adjacent outer wall of the sleeve 31. It is seen that the inner passageway through the member 128 has a tapering wall portion at 131 and forms a long, extended integral sleeve portion of reduced outer diameter 132. The annular shoulder 133 formed by the reduction in the outer diameter of member 128 has a plurality of bores extending axially and at spaced intervals around the periphery thereof, two of these bores being shown at 134 and 135 in which are mounted the spacing pins 136 and 137 respectively, pins 136 and 137 being composed of hard, durable electrically insulating material. The portion of the outer wall of member 128 which is substantially adjacent the bores 134 and 135 is threaded at 138 and in threaded engagement with the adjacent threaded end 141 of a sleeve and fluid channeling member generally designated 142, member 142 having a portion 149 of reduced inner diameter to form annular shoulder 163 and having the lower end 143 of reduced outer diameter with threads 144 on the outside surface thereof. Threads 144 engage threads 91 on the electrode face member. It is seen that the fluid channeling member 142 has a plurality of spaced, radially extending bores through the wall thereof at spaced intervals around the periphery thereof, two of these large diameter bores being shown at 147 and 148 and providing for the flow of water or other cooling fluid, in a manner to be described in greater detail hereinafter.

Disposed substantially within the fluid channel member 142 between the sleeve 132 and the inner wall of supporting and fluid channeling member 142 and spaced therefrom is a cap member generally designated 151 having a closed end portion 152, the inside diameter of the cap member 151 being greater than the outside diameter of the aforementioned sleeve 132 to form a passageway 153 therebetween, and the end of the sleeve 132 stopping well short of the inner surface of the closed end portion 152 of the cap member 151 to form the passageway 154. Cap member 151 is also spaced from member 142 by annular space 150. The upper end of the cap 151 is seen to have a portion of increased wall thickness and increased outer diameter 155, the upper end surface of the cap member 151 substantially abutting against the adjacent ends of the aforementioned insulating pins 136 and 137 which provide for the proper spacing of the member 151.

In an annular groove 158 in the outer surface of wall portion 155 there is seen to be an O-ring or similar seal 159, and the outer wall of portion 155 is seen to be shaped to form a shoulder 160 with a ring 162 composed of an insulating material abutting against the shoulder 160 of cap member 151 and also abutting against the shoulder 163 formed in the inner wall of the aforementioned member 142 where the inner diameter thereof changes abruptly. It is seen that the lower end of the cap member 151 is spaced from the electrode face member by the insulating ring 86 which is preferably composed of a highly heat resistant ceramic and disposed within the annular groove 85 in the electrode face member 90.

Cap member 152 is maintained electrically neutral, by ceramic ring 86 and insulating ring 162, by annular spaces 150 and 153, by insulating spacer pins 136 and 137, and O-ring 159 of rubber or other electrically insulating material.

The aforedescribed cap member 151 and sleeve 132 provide for channeling the flow of water past the closed end 152 to conduct heat therefrom. Water flowing down the annular passageway 32' flows through the radially extending bores 39 and down the annular passageway 40; thence, through passageways 98, 97 and 96 around the back of the arcing surface of the electrode face member into the annular passageway 56; from the annular passageway 56 water flows through the radially extending bores in member 142, two of these bores being shown at 147 and 148. Thence water flows down passageway 153 between the sleeve 132 and the inner wall of the cap member 151. Thence water flows around the end of the sleeve 132 through the passageway 154 and up the inside of the sleeve 132 into the passageway 41'. The flow of water past the closed end portion 152 of the cap member 151 readily conducts heat therefrom, and prevents this surface from being raised by heat of convection or radiation to a temperature which would otherwise result in the destruction of the hub.

Figure 4:
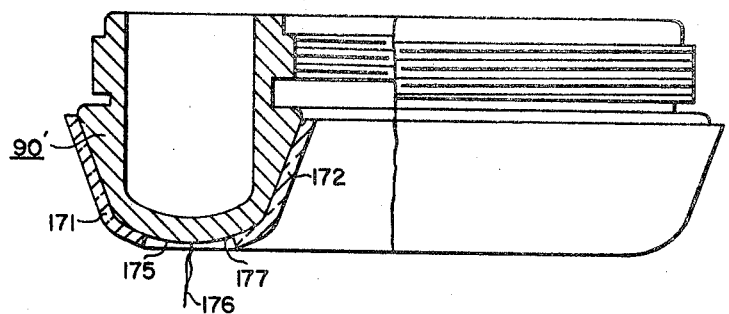
FIG. 4 is a view of an electrode face member according to a third embodiment of our invention.

Particular reference is made now to FIG. 4, where an additional embodiment of the invention is shown, the additional features of FIG. 4 being utilized in either or both of the embodiments of FIGS. 1B or FIG. 3. In FIG. 4, the annular electrode face member generally designated 90' has the outer wall covered on both the slanting side surfaces thereof which form skirts 94 and 95, with coatings of heat resistant material, the coatings being shown at 171 and 172, the coatings being ceramic if desired, or of another suitable material, to thermally insulate that portion of the electrode face which is not utilized as an arcing surface, and leaving the surface portion 175 uncovered, this surface portion 175 providing the arcing surface for the arc 176.

The exposed surface 175, by a suitable choice of dimensions, can be made entirely adequate for the arcing surface, with the result that the thermally insulating coverings 171 and 172 reduce the loss of heat, and they also reduce the deposit of material from the melt on the electrode surface. The gap or space 177 between adjacent terminating edges of the coverings 171 and 172 may be as wide as desired.

As will be readily understood by those skilled in the art, where the nonconsumable electrode of our invention is used for melting paramagnetic or ferromagnetic materials, the action of the magnetic field produced by coil 71, not shown in FIG. 4 for convenience of illustration, is such as to draw melt material up onto the electrode and to deposit it thereon. This deposited material may weaken the magnetic field needed for rotation of the arc. The ceramic layers 171 and 172 may reduce the amount of deposited material and their use thereby offers an additional advantage.

The thermal insulation of the electrode face also results in the reduction of heat flux from arc to electrode; the ceramic coating may be, if desired, a spray coating applied to the electrode face. Other convenient means of applying the coating to the electrode face may also be employed.

The water cooled plug of the embodiment of FIG. 3 offers certain advantages over the ceramic plug of the embodiment of FIG. 1B. In arc heater and non-consumable electrode design the electrode face member is the part which must carry the arc current and withstand the associated temperature rise. To minimize wear the electrode is annular in shape and the arc is moved along its surface by means of a flux field perpendicular to the electric arc. Water circulating through the electrode face member removes the heat that is absorbed by the electrode. The center or hub of the electrode is exposed to extremely high heat fluxes. Any nonceramic insulating material placed in this area may disintegrate or melt within a short period, and even at least some ceramics may deteriorate or degrade after an extended period of use. On the other hand, if the center hub were water cooled metal and were at the same potential as the electrode, the arc might move to the center hub rather than stay on the electrode surface. In our invention, the water cooled metallic hub end 152 is electrically insulated from the electrode face member 90 to prevent arcing to the hub. This is accomplished by the aforementioned annular rings 86 and 162 composed of ceramic or other suitable electrically insulating material. Furthermore, as previously stated it is seen that the cap member 151 is spaced at all times from the sleeve 132, and furthermore that spaces may exist between the adjacent surface of the cap member 151 and the spacer pins 136 and 137. By utilizing electrical insulation of the hub we avoid the necessity for having a deep set, hollow hub. We have obtained additional advantages from reducing the area of the hub, so that less surface area is exposed to radiation, thus reducing heat losses. The water cooled, electrically insulated hub of our invention allows this area to be small.

Figure 5:
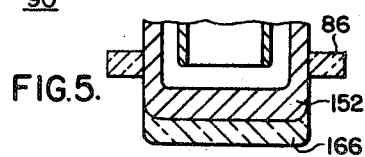
FIG. 5 is a fragmentary view of a hub according to a modification of the apparatus of FIG. 3.

If desired, the outer surface of the hub end portion 152 may be coated with a thermally insulating ceramic material such as aluminum oxide, or other suitable ceramic coating. Such an arrangement is shown in FIG. 5, where the ceramic coating is designated 166.

Particular reference is made now to FIG. 6, in which still a further embodiment of our invention is shown, differeing from the embodiment of FIG. 1B in that the hub is recessed, in that the ceramic sleeve or coating on the outside of the electrode is wire-reinforced over a portion of the electrode, and further in that a water cooled jacket assembly is provided, as will be seen more clearly hereinafter.

In FIG. 6, sleeves 200 and 201 of different diameters with the annular passageway 202 therebetween correspond respectively to tubes or sleeves 31 and 21 of the electrode of FIG. 1. As previously stated, water may flow either in or out of the sleeve or tube 200, and the embodiment of FIG. 6 will be described arbitrarily with reference to water flow out of the sleeve 200, and water flow into the electrode through the annular passageway 202. Sleeve 201, composed of copper, is seen to be threaded at 203 to a field coil and electrode face supporting member generally designated 204, member 204 corresponding to the similar member 37 of FIG. 1. Preferably member 204 is composed of magnetic material. Above the supporting member generally designated 204 and abutting against it is a ring member 205 of somewhat greater diameter than the sleeve 201 and providing therebetween an annular space 206, leads 207 and 208 to a magnetic field producing coil hereinafter to be described in detail passing through the space 206. The ring 205 is seen to have an externally threaded portion 209, the threads of which engage the internally threaded end 211 of a sleeve 212 composed of metal or other suitable material, the sleeve 212 having a portion 213 of increased inner diameter at the lower end thereof to provide a space for mounting an electrode face member generally designated 215. It is seen that a cylindrical-shaped space or passageway 216 exists between the inner wall of the sleeve 212 and the outer wall of the extended lower portion of the support member 204, passageway 216 providing for the flow of water which enters the passageway through a plurality of spaced bores or passageways extending radially through the wall of the support member 204, one of these radial passageways being shown at 217, the passageways 217 communicating with the annular passageway 202. It is seen that an annular groove 218 extends around the outside of the member 204 adjacent the passageways 217 to provide for free flow of water into the cylindrical passageway 216.

The aforementioned ring member 205 has a portion of increased outer diameter 220 to form two shoulders 221 and 222. Abutting against the shoulder 221 is the lower end of a sleeve 224, and disposed external to the sleeve 224 and spaced therefrom is an additional sleeve of metal or other suitable material 225 forming an annular or cylindrical-shaped space 226 therebetween. Water flows in the annular space 226 through suitable entrances and exits, not shown for convenience of illustration, and thereby a water cooled jacket assembly for the electrode is provided. This water cooled jacket assembly may extend substantially the entire length of the electrode from the support member 204 to the head of the electrode, which may be somewhat similar to the head shown in FIG. 2 and FIG. 1A.

The ceramic heat shield generally designated 230, which may be a ceramic sleeve, or a sprayed coating of ceramic, or ceramic applied in any other suitable and convenient way, is seen to have a thin portion 231 and thick portion 232. The ceramic covering protects the outside of the electrode from heat of radiation and convection from the arc and the incandescent gases adjacent thereto, the thin portion 231 extending all the way to the electrode face member 215 and abutting thereagainst, the relatively thick portion 232 having reinforcing wires 233. The relatively thick portion 232 may extend substantially the entire length of the electrode.

The lower end of the support member generally designated 204 is seen to have the inner and outer walls thereof shaped to form two annular shoulders 261 and 262. Mounted on the lower end of the annular supporting member 204 is a coil cup composed of nonmagnetic material generally designated 238, having spaced cylindrical side wall portions 235 and 236 concentrically aligned with each other and having the annular bottom portion 239 with the lower surface thereof arcuate shaped in the form of the curve shown. Disposed inside of the coil cup generally designated 238 is an insulating cup generally designated 240 composed of a polytetrafluoroethylene resin or other suitable material, with an annular bottom portion 241 and two spaced concentric cylindrical side wall portions 242 and 243, the upper edges of the side wall portions abutting against the lower surface 272 of the support member 204, with the spacer ring 273 maintaining the coil in the position shown against axial movement along the length of the electrode.

It is seen that annular passageway 298 exists between the outer wall of the cup 238 and the inner cylindrical wall of the electrode face member generally designated 215, that the annular passageway 297 arcuate in cross-section exists between the curved lower surface of the end portion 239 of the coil cup and the adjacent inner wall portion of the electrode face member 215, and that a passageway 296 which is generally cylindrical in shape exists between the annular outer surface of the inner wall portion 236 of the coil cup 238 and the adjacent inner wall surface of the electrode face member 215. These passageways 298, 297 and 296 communicate as shown with the aforementioned passageway 216 between the support member 204 and the sleeve 212 and provide for the flow of a cooling fluid through a path to be traced in greater detail hereinafter.

Disposed inside of the cylindrical support member 204 is a hub member generally designated 248 having external threads 251 on the upper end thereof in engagement with internal threads 252 on the adjacent portion of the support member 204. The hub member 248 has radially extending bores at spaced intervals around the periphery thereof, two of these bores being shown at 249 and 250, the bores communicating with a cylindrical passageway 256 between the outer wall of the cylindrical hub member 248 and the inner cylindrical-shaped wall of the support member 204. Passageway 256 communicates with aforementioned passageway 296.

Water or other cooling fluid flows down the annular passageway 202, through the spaced radially extending bores 217 in support member 204, around the annular groove 218, down the cylindrical passageway 216, down cylindrical passageway 298, around the passageway 297 near the arcing surface of the electrode, through the cylindrical passageway 296, into the passageway 256, thence through the radial bores including bores 249 and 250, up the passageway 246 formed in the center of cylindrical hub member 248, and out through the sleeve 200.

The electrode face member generally designated 215 is seen to also include two generally cylindrical wall portions of different diameters concentrically disposed with respect to each other and a solid lower end portion which forms the arcing surface. The inner annular wall portion of the electrode face member 215 is threaded at 258 and these threads are in threaded engagement with external threads 257 on the extended end portion 255 of hub member 248. It is seen that the passageway 246 of the hub is closed off by the solid partition 254, to prevent the flow of water into the extended end portion 255.

Adjacent the lower end of the extended end portion 255 is a ring 266 of a highly heat resistant ceramic or other refractory material, which is maintained in place by the overhanging inner skirt portion 295 of the electrode face member 215. There is also an extended skirt portion 294 on the outer wall of the electrode face member 215, and this extended skirt portion 294 abuts against the end of the ceramic coating 231 and the adjacent end of the metallic sleeve 212. If desired, skirt portion 294 may be brazed to the adjacent end 213 of the sleeve 212.

In FIG. 6, the structure of a fluid cooled field coil 237 is shown, the coil having eight turns 281, each turn having a fluid passageway 282 therein. The turns are insulated from each other by insulation 283. Hollow leads 207 and 208 bring cooling fluid to the coil and conduct fluid from the coil. In constructing the coil, the wire or tube may be wrapped with insulation before forming into a coil. The coil is then wound, further insulation being provided, after which the coil may be potted in a suitable resin to form a substantially rigid structure.

Leads 207 and 208 from field coil 237, having fluid passageways 227 and 228 therein respectively extend through an axially extending passageway 271 in the support member 204. A suitable heat resistant insulation 270 encloses the leads 207 and 208. The magnetic field set up by coil 237 is shown at 244. For the purposes of showing the field, the supporting member 204 has been arbitrarily assumed to be composed of magnetic material.

The embodiment of FIG. 6 of our invention, by providing gap 275 of considerable length or depth back of or above the ring 266 of ceramic material, which is highly heat resistant, somewhat simplifies the problem of cooling the hub 248 and preventing radiation from the arc, or convection from the gases from reaching the metallic interior of the electrode and damaging or destroying the metal thereof.

The recessed hub 248 may be brazed to the electrode face member 215, eliminating threads 257 and 258. Hub 248 may also be formed integrally with face member 215 if desired.

Generally speaking then, in summary, our apparatus is well suited to accomplish the aforedescribed objects of our invention. We provide an arcing surface, a field coil which produces a field to move the arc on the arcing surface, metal tubes which carry cooling water and current to the electrode face member and act as structural members, thermal insulation which protects uncooled parts and limits heat losses from the furnace to the electrode, and provisions for mounting, connecting the water supply, and connecting power supplies.

It will be noted that the disposition of our field coil in FIGS. 1B, 3 and 6 is such that the curvature of the magnetic lines of forces follows very closely the curvature or contour of the arcing surface of the electrode face member. In other words, the field coil is at the center of radius of the electrode face member cross section. This is very desirable, since it provides for maximum or optimum field for causing the arc to rotate around the annular arcing surface. Thus, there is provided an improved magnetic field around the electrode, with better driving action for the arc.

One important feature of our invention is the tubular construction of the elements which provide structural support, current conduction and water flow passages. The ceramic sleeves are conveniently assembled and provide an effective heat shield for that portion of our structure which it is not desired to expose to heat of radiation and convection from the arc. The tube or sleeve member 10 may be composed of steel, and this tube provides protection to the coil leads, and structural strength. Sleeve or tube 21 holds the other tubular elements in place, and being made of copper carries most of the current flow to the electrode.

We provide efficient thermal insulation for the electrode structure. We minimize the heat lost to the electrode face and electrode structure and thereby increase electrode efficiency. The first means of doing this is by the cylindrical ceramic sleeve or sleeves over the structure. The second means is by the use of a plug, ceramic or water cooled.

If desired, metal projections may be placed on the structure and a rammed ceramic applied over the structure. If desired, support for the rammed ceramic may be provided by holes in at least some of the structure elements. The rammed ceramic coating offers certain advantages; possible damage due to bumping of the electrode by the furnace charge will be localized and readily repairable between heats.

As previously stated, in one embodiment thermal insulation is provided for portions of the electrode face member to reduce the heat flux from the arc and melt to the electrode.

Another advantage of our apparatus is the ready interchangeability of the electrode face member generally designated 90. This is provided by means of the use of a retaining screw 81, FIG. 1, and a sleeve member 76. When these are removed the electrode face member is readily removed without disturbing the field coil or field coil cover. The electrode face members of FIGS. 3 and 6 may also be made readily removable. In some applications of arc heating it will be very desirable to make the electrode easily replaceable, since it may occasionally suffer damage from hard contact with the scrap charging, or from normal wear.

Our electrode configuration as a whole incorporates the features and elements previously described, and in further summary offers the following advantages:

(1) Thermal insulation to limit heat losses.
(2) Replaceable electrode face member which may be removed quickly and easily.
(3) Inexpensive water passage system with transient boiling and water flow perpendicular to the arc and to the direction of arc motion.
(4) Relatively rigid structure of metal tubes which will stand abuse and is simple and inexpensive.
(5) Overall simplicity and compactness and adaptability.
(6) Is especially suitable for the electric arc furnace field, and in this application has the following additional features including:
    (a) The ability to profile to limit hot gas blasts to sides of furnaces, thereby reducing corrosion of walls and heat losses.
    (b) Cooling and moving of arc spot on the electrode to prevent erosion of electrode material.
(7) The use of a water cooled field coil which allows us to minmize the space required for a field coil of predetermined ampere turns rating; thus allowing placement of the field coil within the electrode tip for optimum field utilization.

Whereas we have described our electrode structures with reference to use in an arc furnace, it will be understood that our electrode could be used in an arc heater or plasma generator, if desired.

Other suitable fluids, instead of water, may be used for cooling if desired.

The electrodes of our invention are substantially nonconsumable and have a useful life many orders of magnitude greater than the carbon or graphite electrodes now generally in use.

It will be understood that the water-cooled field coil construction of FIG. 6 may be used in the embodiments of FIGS. 1 and 3.

"Surface of other polarity" as used in the claims appended hereto includes the melt as well as another electrode, or any other arcing surface, and includes arcs formed while the electrode is energized by direct current, or alternating current.

The fluid cooled jacket of the embodiment of FIG. 6 may be used on the apparatus of FIGS. 1 and 3.

The electrode may be used with equal facility in vertical or horizontal positions, or at any convenient angle.

The electrode may be used in combination with other electrodes as for example, three electrodes for 3 phase operation in an arc furnace.

The word "conductive" when used herein and in the claims appended hereto without a modifier means electrically conductive.

Changing from a nonmagnetic material to a magnetic material for support members 37 and 204 may increase the field strength at the arcing surface in the order of 10 percent.

Whereas we have shown and described our invention with respect to some embodiments thereof which give satisfactory results, it should be understood that changes may be made and equivalents substituted without departing from the spirit and scope of the invention.

We claim as our invention:

1. A nonconsumable arc electrode comprising, in combination, a tubular structure including a first sleeve forming a passageway, means mounting a second sleeve around the first sleeve coaxially therewith, the second sleeve being of greater diameter and forming an annular additional passageway between the second sleeve and the first sleeve, at least one of the first and second sleeves being composed of a conductive material, electrode head means secured to one end of the tubular structure and including fluid inlet means and fluid outlet means communicating selectively with the passageway in the first sleeve and the annular additional passageway between the first sleeve and the second sleeve, fluid cooled hollow generally annular electrode face means mounted at the other end of the tubular structure and secured thereto and operatively connected to the fluid inlet means and fluid outlet means by way of the passageway and the additional passageway, a field coil, the tubular structure including means supporting the field coil within the electrode face means near the arcing surface of the electrode face means, means including the sleeve of conductive material forming an electrical circuit between the electrode face means and the electrode head means, and means connected to the field coil for energizing the coil to set up a magnetic field at the arcing surface of the electrode face means.

2. A nonconsumable arc electrode comprising, in combination, a tubular structure including fluid inlet means, the tubular structure including a first elongated sleeve composed of metallic material communicating with one of the fluid inlet and outlet means to form one fluid passageway, a second elongated sleeve composed of metallic material larger in diameter than the first sleeve and mounted coaxially therewith to form another fluid passageway which communicates with the other of the fluid inlet and outlet means, an annular electrode face member composed of conductive, nonmagnetic material having an annular groove of substantial depth extending therearound, cylindrical fluid channeling means secured at one end thereof to the tubular structure and having the other end thereof extending at least partially into the annular groove in the electrode face member, means for securing the electrode face member to the tubular structure in spaced relation from the cylindrical fluid channeling means to form further passageways between the walls of the cylindrical fluid channeling means and the walls of the groove in the electrode face member, the last-named passageways communicating with the passageways formed by the first and second sleeves and providing for the flow of a cooling fluid around the walls of the groove in the electrode face member, coil means in the annular groove of the electrode face member and secured to the adjacent end of the cylindrical fluid channeling means, lead means for bringing an electrical current to coil means to set up a magnetic field at the arcing surface of the electrode face member, and circuit means for applying an electrical potential to the electrode face member, the circuit means including at least one of the first and second elongated sleeves, the magnetic field of the coil causing the arc from the electrode face member to move continuously in a substantially circular path along the annular arcing surface of the electrode face member.

3. A nonconsumable arc electrode comprising, in combination a partially hollow annular electrode face member composed of a material which is highly heat conductive, electrically conductive and nonmagnetic, an electrode body portion including cylindrical sleeve means having the electrode face member secured thereto and other substantially cylindrical sleeve means extending into the electrode face member but spaced therefrom to form passageways near the arcing surface of the annular electrode face member on both sides of the other cylindrical sleeve means, a fluid cooled field coil located in the electrode face member and secured to and supported by the other cylindrical sleeve means in spaced position from the electrode face member, means for energizing the field coil to set up a magnetic field at the arcing surface of the electrode face member, said electrode body portion having at least a portion thereof composed of conductive material and including a plurality of tubular means and cylindrical support means, the tubular means forming passageways for bringing a cooling fluid to the passageways of the annular electrode face member and for conducting fluid therefrom, the portion of the electrode body portion composed of conductive material being adapted to have an electrical potential applied thereto to form an arc from the electrode face member, the arc being moved substantially constantly over the electrode face member in a substantially circular path by the magnetic field set up by the field coil.

4. A nonconsumbale electrode for an electric arc furnace comprising, in combination, a tubular structure including fluid inlet and fluid outlet means and a fluid inlet passageway extending axially of the tubular structure and a fluid outlet passageway etxending axially of the tubular structure, an annular electrode face member composed of conductive, nonmagnetic material having an annular groove extending axially thereof, cylindrical supporting and fluid channeling means extending at least partially into the annular groove in the electrode face member, means for securing the electrode face member in spaced position from the cylindrical supporting and fluid channeling means to form passageways between the walls of the cylindrical supporting and fluid channeling means and the walls of the groove in the electrode face member, the last named passageways communicating with the fluid inlet and fluid outlet passageways in the tubular structure and providing for the flow of a cooling fluid around walls of the groove of the electrode face member, coil means disposed at least partially in the electrode face member in predetermined position with respect to the arcing surface of the electrode face member, lead means for bringing an electrical current to the coil means to set up a magnetic field at the arcing surface of the electrode face member, and means for applying an electrical potential to the electrode face member to cause an arc therefrom, the magnetic field causing the arc from the electrode face member to move substantially continuously in a substantially circular path about the annular arcing surface of the electrode face member.

5. An electrode according to claim 4 in which the coil means is additionally characterized as being so disposed with respect to the arcing surface of the electrode face member that the lines of force of the magnetic field set up by the coil means have a curvature which substantially follows the contour of the arcing surface of the electrode face member and are substantially transverse to both the path of arc current and the path of movement of the arc around the annular arcing surface.

6. A nonconsumable arc electrode comprising, in combination, annular electrode face means composed of nonmagnetic, conductive material, magnetic field producing means mounted in the electrode face means, the electrode face means having a passageway therein near the arcing surface thereof for the flow of a cooling fluid, a tubular structure composed at least partially of conductive material supporting the magnetic field producing means and the electrode face means and making electrical connection with the electrode face means, heat shield means external to at least a portion of the tubular structure, the tubular structure including concentric tubes providing a cylindrical passageway between tubes for the flow of a cooling fluid to the passageway in the electrode face means and a tubular passageway for conducting fluid from the passageway in the electrode face means, the conductive portion of the tubular structure being adapted to have a source of electrical potential connected thereto for producing an arc from the arcing surface of the electrode face means, a cylindrical fluid channeling member mounted in the tubular structure and having the magnetic field producing means secured to the lower end thereof, the magnetic field causing the arc to move substantially continuously over said arcing surface, and other fluid channeling means including a plug of refractory material mounted centrally in the tubular structure and directing fluid from the electrode face means to the tubular passageway, said plug of refractory material being exposed to radiation from the arc.

7. An electrode according to claim 2 including in addition a plug member composed of a highly heat resistant material mounted in the central aperture of the annular electrode face member, and a sleeve composed of a highly heat resistant material disposed around the outside of at least that portion of the tubular structure adjacent the electrode face member.

8. A nonconsumable electrode for use in an arc furnace comprising, in combination, a tubular structure composed at least partially of conductive material and including means forming a fluid inlet passageway and a fluid outlet passageway, supporting means disposed at the arcing end of the tubular structure, and an annular electrode face member composed of nonmagnetic, electrically conductive and highly heat conductive material mounted on and secured to the supporting means, the electrode face member and the supporting means being constructed and arranged to provide a passageway near the arcing surface of the electrode face member which communicates with the fluid inlet and fluid outlet passageways in the tubular structure, the passageway of the electrode face member having a cooling fluid flowing therethrough, coil means disposed adjacent the electrode face member, circuit means connected to the coil means for bringing an energizing potential thereto to set up a magnetic field which causes the arc to move continuously over the arcing surface of the electrode face member, heat shield means including sleeve means composed of a material which is highly heat resistant disposed around the outside of the tubular structure and the supporting means near the electrode face member, plug means composed of a highly heat resistant material disposed in the central aperture of the annular electrode face member, a removable retaining ring composed of highly heat resistant material retaining the plug means in place therein, and spring means normally urging the plug means against the retaining ring.

9. In an electrode and hub assembly for use in a nonconsumable electrode, in combination, an annular partially hollow electrode face member composed of conductive nonmagnetic material, annular fluid channeling and supporting means mounting the electrode face member and forming a passageway therein near the arcing surface thereof for the flow of a cooling fluid, the fluid channeling and supporting means including means forming a passage for bringing fluid to the electrode face member, a retaining member mounted in the annular fluid channeling and supporting means in threaded engagement therein, the retaining member including means forming an extended sleeve portion of a first predetermined outer diameter and open at the end thereof adjacent the electrode face member, and a cap member with a cylindrical wall portion of a second predetermined inner diameter greater than the first diameter, the cap member enclosing the open end of the sleeve portion, the wall portion of the cap member being disposed around the sleeve portion coaxially therewith and having the outer end of the cap member closed to form an annular passageway for the flow of a cooling fluid, a fluid passageway being formed for fluid leaving the electrode face member through the annular passageway between the cap wall portion and the sleeve portion thence around the closed end surface of the cap member and through the sleeve portion, and other means forming a passage for conducting fluid from the sleeve portion to the exterior of the electrode.

10. An electrode according to claim 4 in which the coil means is addiitonally characterized as being located substantially at the center of radius of curvature of the arcing surface thereby providing a magnetic field in which the curvature of the magnetic lines of force substantially follows the contour of the arcing surface of the electrode face member.

11. An electrode according to claim 4 including in addition thermally insulating means disposed on that portion of the electrode face member not utilized as an arcing surface, the thermally insulating means including layers extending up the outsides of the electrode face member, the adjacent edges being spaced from each other.

12. An electrode according to claim 2 wherein the annular electrode face member is additionally characterized as having a coating composed of a highly heat resistant material disposed over at least a portion of the surface of the outer annular skirt portion thereof and as having a coating composed of a highly heat resistant material disposed over at least a portion of the surface of the inner annular skirt portion thereof, the electrode face member having at least an uncoated annular portion of substantial width of the arcing surface lying between the two coated portions, the arc from the electrode taking place from the uncoated portion.

13. An electrode according to claim 1 additionally characterized as having an annular coating composed of a heat resistant ceramic disposed around the outer annular skirt portion of the electrode face means thereof and an annular coating of said highly heat resistant ceramic disposed over at least a portion of the inner annular skirt portion of the electrode face means thereof, the electrode face means having a substantial annular uncoated surface between the two coated portions, the uncoated surface forming the arcing surface of the electrode face means.

14. An electrode according to claim 4 additionally characterized as having an electrode face member with a portion of the outer annular skirt portion thereof coated with a highly heat resistant ceramic and a portion of the inner annular skirt poriton thereof coated with a highly heat resistant ceramic, there being an exposed portion of the arcing surface between the two coated portions.

15. An electrode according to claim 4, including in addition coating means composed of a highly heat resistant material covering at least a portion of the outer surface of the electrode face member.

16. An electrode according to claim 4 including in addition a coating of a higly heat resistant material on the outer surfaces of the electrode which are exposed to radiation from the arc.

17. A hub and electrode assembly according to claim 9 including in addition a coating of a highly heat resistive material disposed on the outer surface of the closed end of the cap member.

18. In a nonconsumable electrode, in combination, a fluid cooled annular electrode face member, a field coil disposed at least partially in the annular electrode face member, means including a cylindrical fluid channeling means for bringing a cooling fluid to the electrode face member, hub means disposed within the fluid channeling means and forming a passageway between the inside wall of the cylindrical fluid channeling means and the outside wall of the hub means, the hub means having radially extending passageways therethrough for the passage of fluid from the passageway into the interior of the hub means, said hub means communicating with means forming a passageway for the flow of the fluid from the electrode, means enclosing the end of the hub means, and a ring of highly heat resistant material mounted at the end of the hub means.

19. An electrode according to claim 18 including in addition means forming a fluid cooled jacket extending over at least a large portion of the outside surface of the electrode, said cooling jacket including a coating of a highly heat resistant material extending over substantially the entire electrode from the electrode face member to the top portion of the electrode.

20. An electrode according to claim 2 in which the arcing surface is additionally characterized as being arcuate, and the center of the field coil is located substantially at the center of the radius of curvature of the arcuate arcing surface whereby the lines of force of the magnetic field are transverse to the arcing surface and have a curvature which is substantially similar to the contour of the arcing surface.

21. An electrode according to claim 2 in which the electrode face member is additionally characterized as being composed of copper.

22. An electrode according to claim 9 including in addition means electrically insulating the cap member from the remainder of the electrode.

23. A nonconsumable electrode according to claim 1 including in addition thermally insulating means covering those portions of the electrode face means not utilized as an arcing surface.

24. An electrode according to claim 4 including in addition means forming a fluid cooled jacket for the tubular structure.

25. A nonconsumable electrode according to claim 4 in which the coil means is additionally characterized as being fluid cooled.

26. A nonconsumable electrode according to claim 4 in which the coil means is additionally characterized as being composed of a hollow conductor and including in addition hollow lead means adapted to bring a cooling fluid to the coil means and conduct fluid from the coil means.

27. In an electrode the combination of an electrode tip generally annular in shape and generally arcuate in cross section, the tip having a passageway therein for the flow of cooling fluid near the arcing surface, said passageway extending substantially 360 degrees around the tip with an annular entrance extending around the entire tip and an annular exit extending around the entire tip, first means forming a cylindrical fluid flow passageway directly connecting with the annular entrance and supplying cooling fluid thereto at substantially all points around the 360 degree curvature of the annular entrance, and second means forming an additional cylindrical fluid flow passageway directly connecting with the annular exit, whereby sheet flow of cooling fluid in the tip effectively cools the arcing surface, and whereby maximum flow efficiency is achieved.

28. In an electrode for use in an arc furnace, the combination of a fluid cooled generally annular electrode tip forming an arcing surface and a supporting structure therefor, at least a portion of the supporting structure being composed of electrically conductive material for bringing a current to the tip to produce and sustain the arc, the tip including an outer portion and an inner portion spaced therefrom to provide a passageway for the flow of cooling fluid near the arcing surface, said last named passageway having a substantially annular entrance which extends substantially 360 degrees around the tip, said last named passageway having a substantially annular exit which extends substantially 360 degrees around the tip, the supporting structure including first means detachably securing the outer portion of the tip to the supporting structure, the supporting structure including second means securing the inner portion of the tip in spaced position from the outer portion while the outer portion is secured to the supporting structure in a manner to maintain the annular entrance and the annular exit, the outer portion of the tip being removable without disturbing the position of the inner portion of the tip.

29. An electrode according to claim 28 in which the outer portion of the tip is threaded to the supporting structure.

30. An electrode according to claim 28 in which the inner portion of the tip has an annular magnetic field coil therein supported by the second securing means.

31. An electrode according to claim 24 including in addition reinforcing wires in the water-cooled jacket.

References Cited

UNITED STATES PATENTS

| | | | |
|---|---|---|---|
| 2,472,851 | 6/1949 | Landis et al. | 219—123 XR |
| 2,286,210 | 6/1942 | Klemperer et al. | 219—100 X |
| 2,286,211 | 6/1942 | Dawson et al. | 219—100 X |
| 2,191,152 | 2/1940 | Hammel | 174—209 X |
| 3,097,321 | 7/1963 | Le Row et al. | 313—32 |
| 3,194,941 | 7/1965 | Baird | 219—121 |
| 3,201,560 | 8/1965 | Mayo et al. | 219—123 X |

FOREIGN PATENTS 874,390  8/1961  Great Britain.

BERNARD A. GILHEANY, *Primary Examiner.*

H. B. GILSON, *Assistant Examiner.*